United States Patent
Yoneyama

(10) Patent No.: US 6,853,497 B2
(45) Date of Patent: Feb. 8, 2005

(54) WIDE-ANGLE ZOOM LENS SYSTEM

(75) Inventor: Shuji Yoneyama, Saitama (JP)

(73) Assignee: PENTAX Corporation, Tokyo (JP)

(*) Notice: Subject to any disclaimer, the term of this patent is extended or adjusted under 35 U.S.C. 154(b) by 0 days.

(21) Appl. No.: 10/636,554

(22) Filed: Aug. 8, 2003

(65) Prior Publication Data

US 2004/0051958 A1 Mar. 18, 2004

(30) Foreign Application Priority Data

Aug. 22, 2002 (JP) .................................. 2002-242336

(51) Int. Cl.$^7$ .............................................. G02B 15/14
(52) U.S. Cl. ..................................... 359/689; 359/687
(58) Field of Search ................................. 359/687, 689

(56) References Cited

U.S. PATENT DOCUMENTS

| | | | | |
|---|---|---|---|---|
| 5,668,668 A | | 9/1997 | Shibayama et al. ......... | 359/683 |
| 5,867,326 A | * | 2/1999 | Yamamoto .................. | 359/686 |
| 6,246,529 B1 | | 6/2001 | Sensui ........................ | 359/680 |
| 6,327,098 B1 | | 12/2001 | Sensui ........................ | 359/680 |

FOREIGN PATENT DOCUMENTS

| | | |
|---|---|---|
| JP | 470706 | 3/1992 |
| JP | 8248312 | 9/1996 |
| JP | 2000131611 | 5/2000 |
| JP | 2000131612 | 5/2000 |

OTHER PUBLICATIONS

English Language Translation of JP Appln. No. 4–70706.
Camera Test, Photo Industry, vol. 59, No. 11, Nov. 11, 2001, p. 67, together with an English Language Translation.

* cited by examiner

Primary Examiner—Georgia Epps
Assistant Examiner—William Choi
(74) Attorney, Agent, or Firm—Greenblum & Bernstein, P.L.C.

(57) ABSTRACT

A wide-angle zoom lens system includes a negative first lens group, a positive second lens group, and a positive third lens group, in this order from the object. Upon zooming from the short focal length extremity to the long focal length extremity, the distance between the first lens group and the second lens group decreases, and the distance between the second lens group and the third lens group decreases.

6 Claims, 16 Drawing Sheets

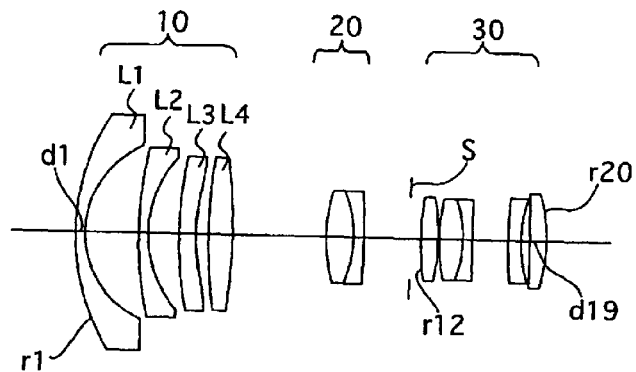
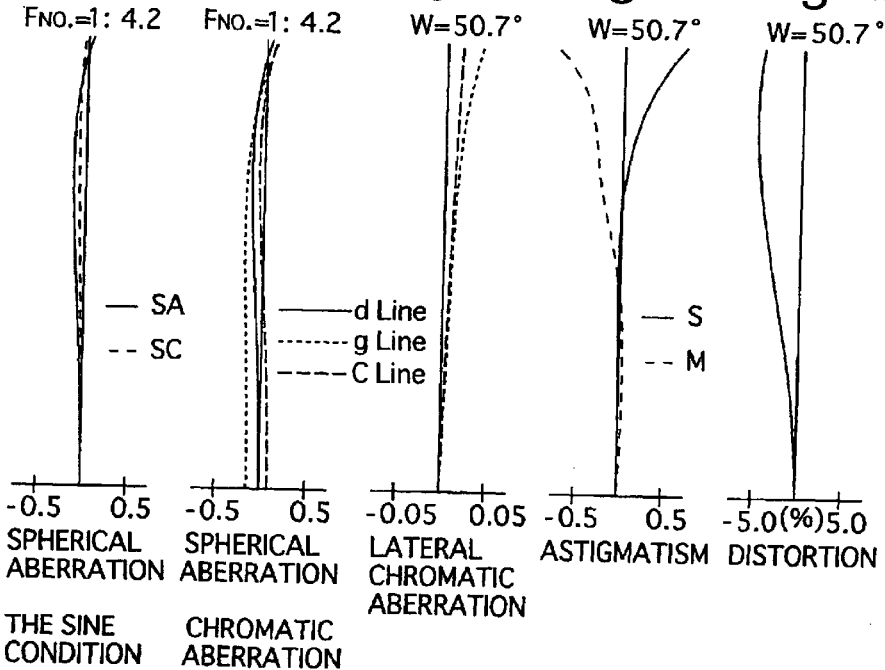

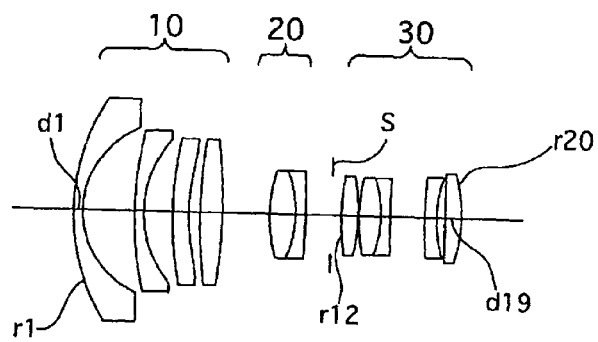
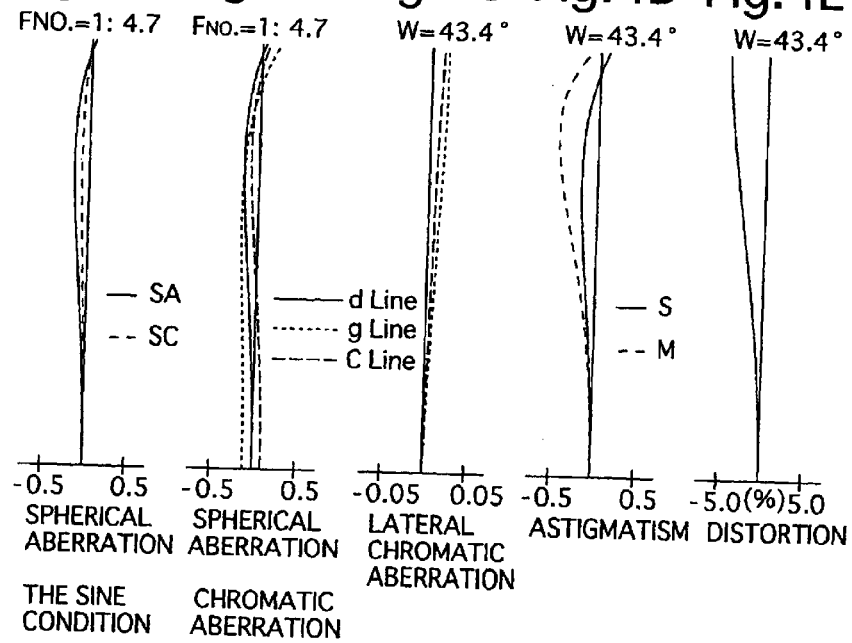

Fig. 5
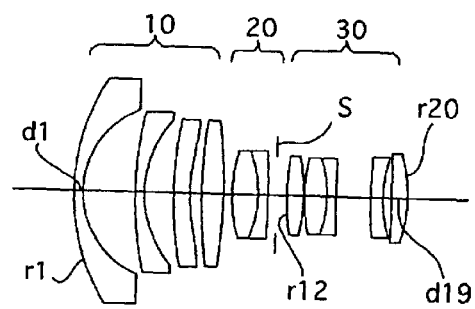
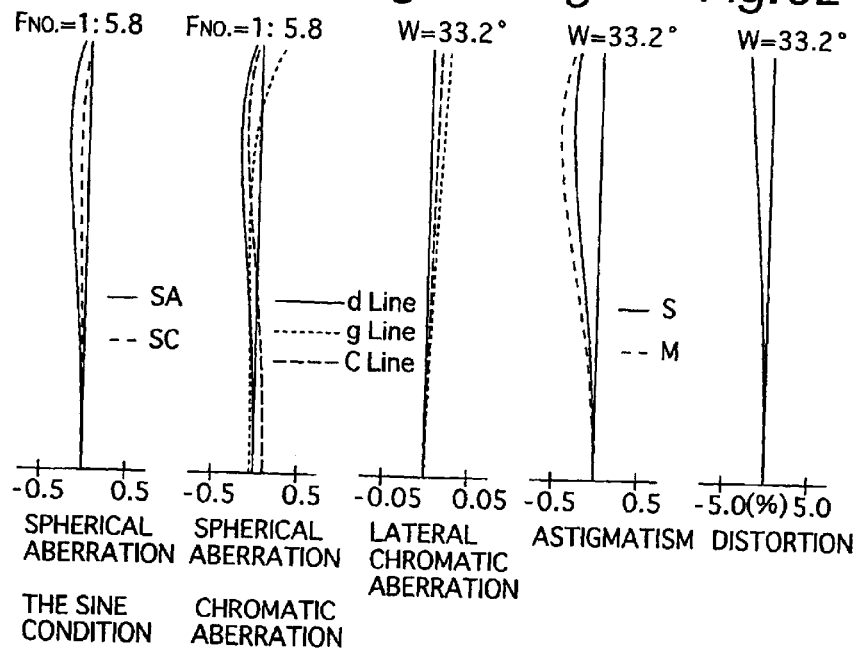

Fig. 7
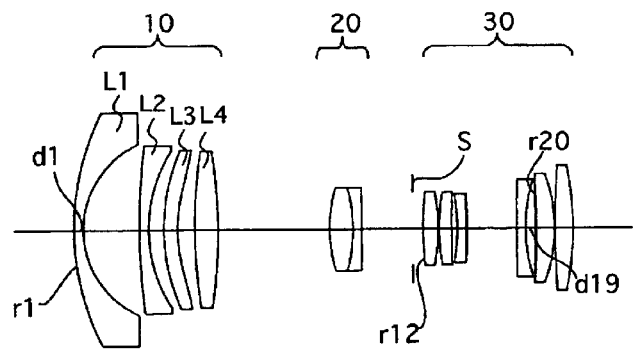
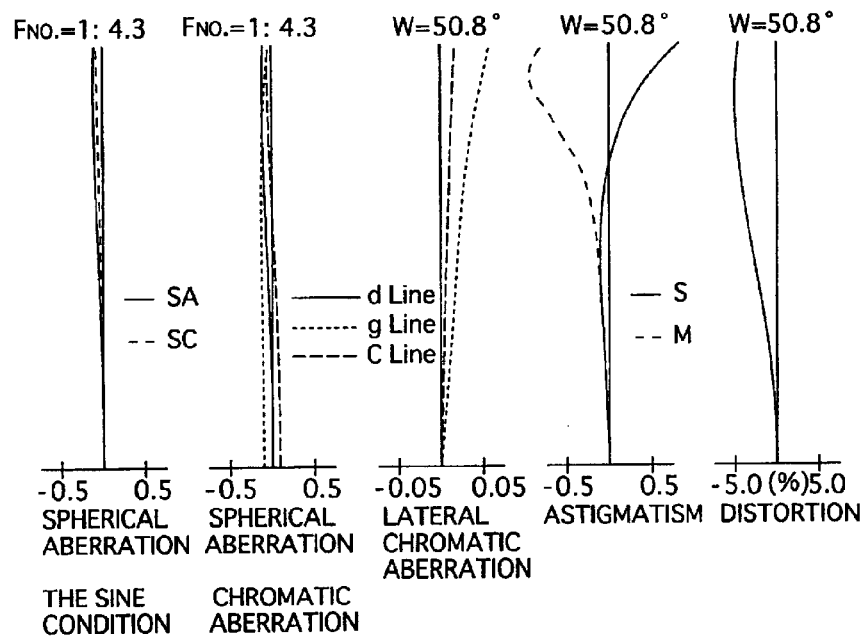

Fig. 13
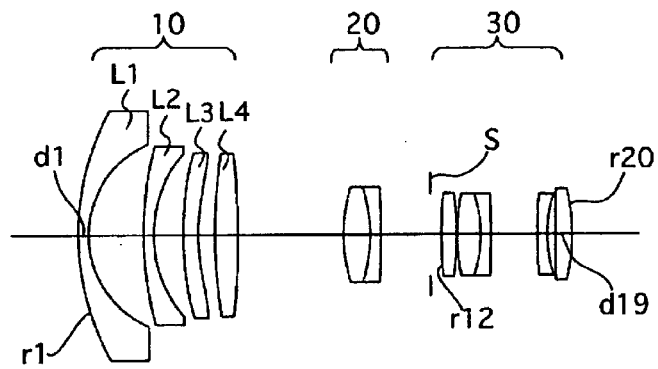
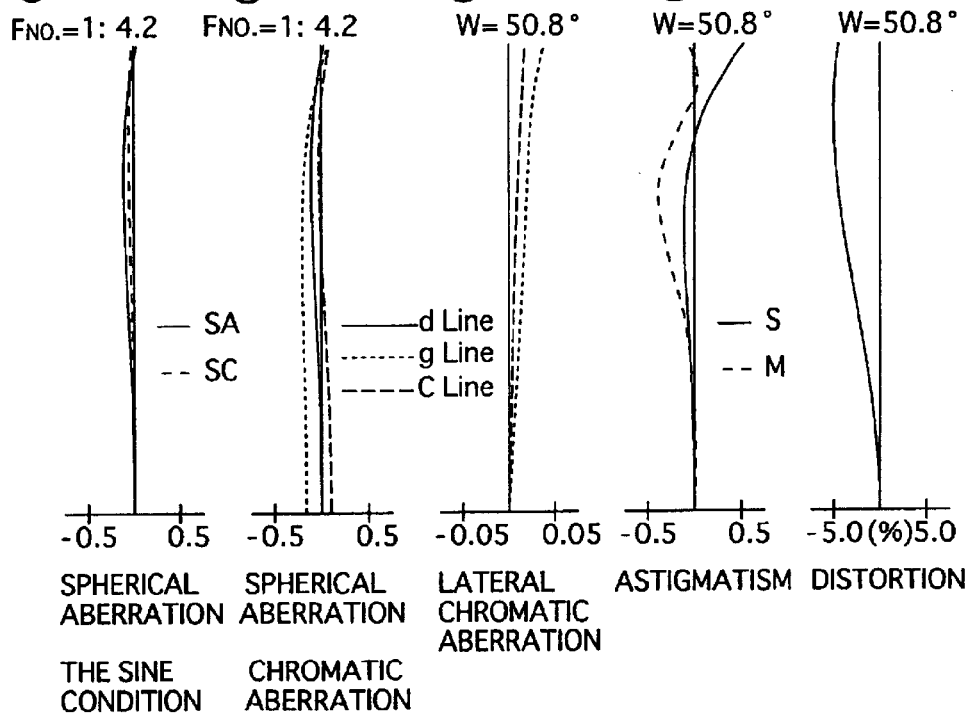

Fig. 29
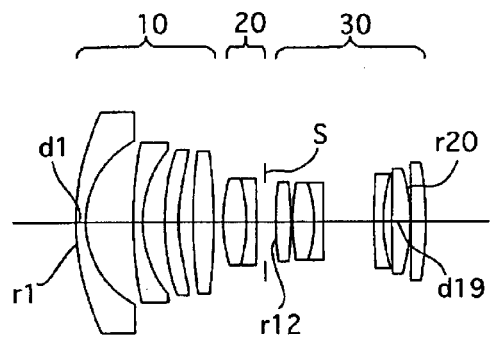
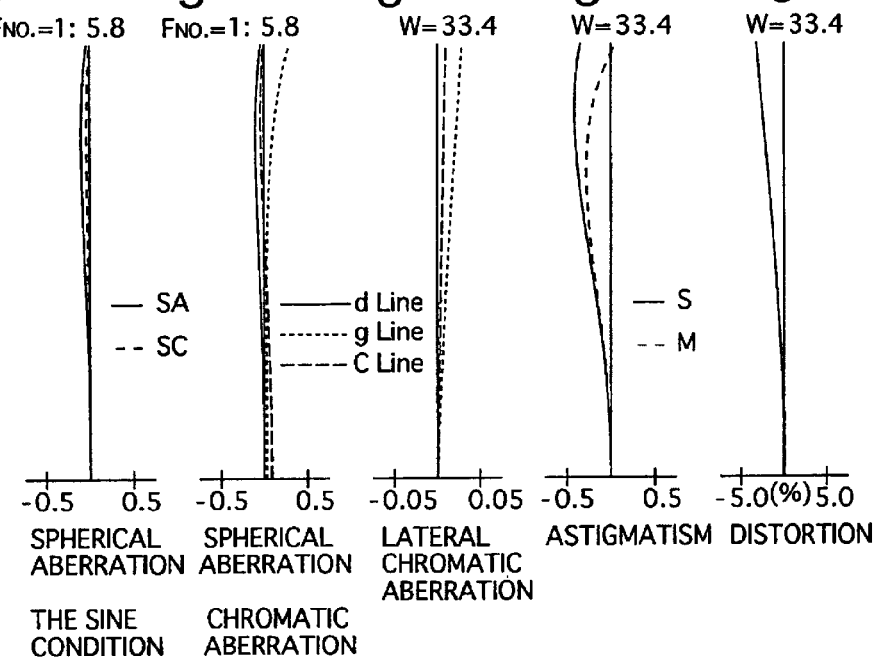
Fig.30A Fig.30B Fig.30C Fig.30D Fig.30E

WIDE-ANGLE ZOOM LENS SYSTEM

BACKGROUND OF THE INVENTION

1. Field of the Invention

The present invention relates to a wide-angle zoom lens system having an angle-of-view of approximately 100° at the short focal length extremity.

2. Description of the Prior Art

Zoom lens systems whose purpose is to achieve a wider angle-of-view through a three-lens-group arrangement, i.e., a lens group having a negative power (hereinafter, a negative lens group), and a lens group having a positive power (hereinafter, a positive lens group) and another positive lens group in this order from the object, are proposed in Japanese Unexamined Patent Publication (JUPP) Nos. Hei-4-70706, U.S. Patent (hereinafter, U.S. Pat. No. 6,246,529, and U.S. Pat. No. 6,327,098. However, the angle-of-view at the short focal length extremity in the zoom lens system of JUPP No. Hei-4-70706 is about 61.6°, and the zoom lens systems of U.S. Pat. No. 6,246,529 and U.S. Pat. No. 6,327,098 are 95.6°. Accordingly, the wider angle-of-view at the short focal length extremity has not been sufficiently achieved, and no consideration has substantially be taken to miniaturization on the lens diameter which becomes larger as an increase of the angle-of-view.

SUMMARY OF THE INVENTION

The present invention provides a miniaturized and wide-angle zoom lens system which (i) achieves a wide angle-of-view of about 100° at the short focal length extremity, and (ii) reduces the lens diameter tends to be larger as an increase of the angle-of-view.

According to an aspect of the present invention for mainly reducing the diameter of the frontmost lens group, there is provided a wide-angle zoom lens system including a negative first lens group, a positive second lens group, and a positive third lens group, in this order from the object.

Upon zooming from the short focal length extremity to the long focal length extremity, the distance between the negative first lens group and the positive second lens group decreases, and the distance between the positive second lens group and the positive third lens group decreases.

The negative first lens group includes at least one positive lens element; and the wide-angle zoom lens system satisfies the following conditions:

$$0.30 < fw/f_{1P} < 0.40 \quad (1)$$

$$-1.0 < (r_{1P-2} + r_{1P-1})/(r_{1P-2} - r_{1P-1}) < 1.0 \quad (2)$$

wherein fw designates the entire focal length of the wide-angle zoom lens system at the short focal length extremity;

$f_{1P}$ designates the focal length of a positive lens element having the strongest optical power (hereinafter, power) in the negative first lens group;

$r_{1P-1}$ designates the radius of curvature of the object-side surface of the positive lens element having the strongest power in the negative first lens group; and $r_{1P-2}$ designates the radius of curvature of the image-side surface of the positive lens element having the strongest power in the negative first lens group.

The negative first lens group can be constituted by a negative meniscus lens element having the convex surface facing toward the object, another negative meniscus lens element having the convex surface facing toward the object, a meniscus lens element, with a weak power, having the convex surface facing toward the object, and a biconvex positive lens element, in this order from the object.

The meniscus lens element (with the weak power) can be provided with either a positive power or a negative power under the condition that the power is weak. However, even in the case where the meniscus lens element is provided with a positive power, the biconvex positive lens element at the most image-side of the negative first lens group is designed to have the strongest positive power thereof.

The wide-angle zoom lens system preferably satisfies the following condition:

$$0.66 < \Delta X2/\Delta X3 < 0.80 \quad (3)$$

wherein $\Delta X2$ designates the traveling distance of the positive second lens group from the short focal length extremity to the long focal length extremity; and $\Delta X3$ designates the traveling distance of the positive third lens group from the short focal length extremity to the long focal length extremity.

A diaphragm is preferably provided on the object-side of the positive third lens group, and arranged to move together therewith.

According to another aspect of the present invention for reducing both the diameter of the frontmost lens group and aberrations which tends to increase as an increase of the angle-of-view, in the negative first lens group, a positive lens element is provided at the most image-side thereof, and on the object-side of the positive lens element, a meniscus lens element, with a weak power, having the convex surface facing toward the object is provided. The meniscus lens element is made of plastic, and has at least one aspherical surface on which a positive power becomes stronger as the height from the optical axis increases, compared with a positive power of a paraxial spherical surface portion of the aspherical surface; and the wide-angle zoom lens system satisfies the following condition:

$$fw/|fm| < 0.25 \quad (4)$$

wherein fm designates the focal length of the plastic meniscus lens element having the aspherical surface; and fw designates the entire focal length of the wide-angle zoom lens system at the short focal length extremity.

Note that the plastic meniscus lens element with the aspherical surface can be provided with either a positive power or a negative power. However, even in the case where the plastic meniscus lens element is provided with a positive power, the positive power thereof is designed to be weaker than the positive power of the most image-side positive lens element of the negative first lens group.

The above explained plastic meniscus lens element is preferably provided with an aspherical surface on both surfaces thereof; and the wide-angle zoom lens system satisfies the following condition:

$$0.06 < (\Delta_{ASP1} - \Delta_{ASP2})/fw < 0.10 \quad (5)$$

wherein $\Delta_{ASP1}$ designates the difference in sagitta of the aspherical surface and sagitta of the paraxial spherical surface at the image height h from the optical axis on the object-side surface of the plastic meniscus lens element; and $\Delta_{ASP2}$ designates the difference in sagitta of the aspherical surface and sagitta of the paraxial spherical surface at the image height h from the optical axis on the image-side surface of the plastic meniscus lens element.

The present disclosure relates to subject matter contained in Japanese Patent Application No. 2002-242336 (filed on Aug. 22, 2002) which is expressly incorporated herein in its entirety.

BRIEF DESCRIPTION OF THE DRAWINGS

The present invention will be discussed below in detail with reference to the accompanying drawings, in which:

FIG. 1 is a lens arrangement, at the short focal length extremity, of the wide-angle zoom lens system according to a first embodiment of the present invention;

FIGS. 2A, 2B, 2C, 2D and 2E show aberrations occurred in the lens arrangement shown in FIG. 1;

FIG. 3 is a lens arrangement, at an intermediate focal length extremity, of the wide-angle zoom lens system according to the first embodiment;

FIGS. 4A, 4B, 4C, 4D and 4E show aberrations occurred in the lens arrangement shown in FIG. 3;

FIG. 5 is a lens arrangement, at the long focal length extremity, of the wide-angle zoom lens system according to the first embodiment;

FIGS. 6A, 6B, 6C, 6D and 6E show aberrations occurred in the lens arrangement shown in FIG. 5;

FIG. 7 is a lens arrangement, at the short focal length extremity, of the wide-angle zoom lens system according to a second embodiment of the present invention;

FIGS. 8A, 8B, 8C, 8D and 8E show aberrations occurred in the lens arrangement shown in FIG. 7;

FIG. 13 is a lens arrangement, at the short focal length extremity, of the wide-angle zoom lens system according to a third embodiment of the present invention;

FIGS. 14A, 14B, 14C, 14D and 14E show aberrations occurred in the lens arrangement shown in FIG. 13;

FIG. 29 is a lens arrangement, at the long focal length extremity, of the wide-angle zoom lens system according to the fifth embodiment;

FIGS. 30A, 30B, 30C, 30D and 30E show aberrations occurred in the lens arrangement shown in FIG. 29.

DESCRIPTION OF THE PREFERRED EMBODIMENTS

Figure 31:
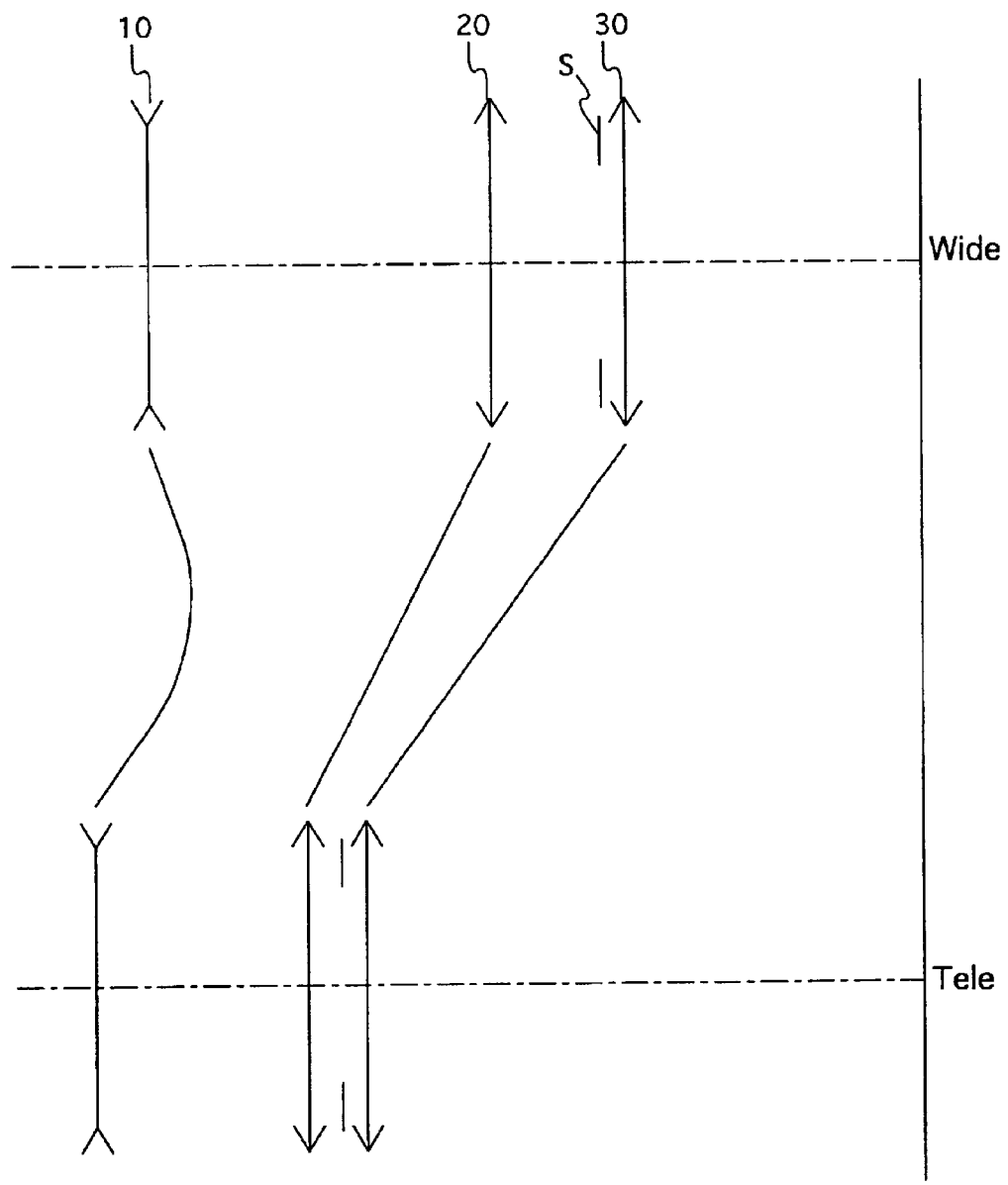
FIG. 31 is a schematic view of the lens-group moving paths for the wide-angle zoom lens system according the present invention.

The wide-angle zoom lens system of the present invention, as shown in the lens-group moving paths of FIG. 31, is constituted by a negative first lens group 10, a positive second lens group 20, and a positive third lens group 30, in this order from the object.

Upon zooming from the short focal length extremity to the long focal length extremity, the distance between the negative first lens group 10 and the positive second lens group 20 decreases, and the distance between the positive second lens group 20 and the positive third lens group 30 decreases.

Focusing is performed by the negative first lens group 10. A diaphragm S is provided in front (on the object side) of the positive third lens group 30, and moves together therewith.

Specifically, the negative first lens group 10 is constituted by a negative meniscus lens element L1 having the convex surface facing toward the object, another negative meniscus lens element L2 having the convex surface facing toward the object, a meniscus lens element L3, with a weak power, having the convex surface facing toward the object, and a biconvex positive lens element L4, in this order from the object.

The meniscus lens element L3 can be provided with either a positive power or a negative power under the condition that the power is weak. However, even in the case where the meniscus lens element L3 is provided with a positive power, the biconvex positive lens element L4 at the most image-side of the negative first lens group 10 is designed to have the strongest positive power thereof.

A wide-angle zoom lens system in which the first lens group is provided with a negative power is generally utilized due to the following reasons:

(i) in order to secure a space for positioning a quick-return mirror for an SLR camera;

(ii) in order to secure a space for various filters in front of the image plane; and (iii) in order to prevent vignetting, and to prevent a decrease of peripheral illumination according to the cosine-fourth law.

However, in such a wide-angle zoom lens system having the negative first lens group, the entrance pupil is positioned in the lens system, and the angle of incidence of an off-axis light ryas with respect to the angle-of-view becomes larger. Consequently, the diameter of the frontmost lens group increases.

In order to avoid an increase in diameter of the frontmost lens group, a positive lens element (the biconvex positive lens element L4) is positioned at the most image-side of the negative first lens group 10. Due to this arrangement, off-axis light rays are largely bent outwards from the optical axis by the object-side negative lens elements (the negative meniscus lens elements L1 and L2) in the negative first lens group 10, and the light rays are largely bent by the biconvex positive lens element L4 toward the optical axis. Consequently, the entrance pupil position is moved toward the object, so that the diameter of the frontmost lens group can be made smaller. In order to achieve the above-mentioned function, it should be noted again that a positive lens element (the biconvex positive lens element L4) is preferably positioned at the most image-side of the negative first lens group 10.

Condition (1) is for making the power of the positive lens element in the negative first lens group 10 relatively stronger. Note that the amount of the power of the negative first lens group 10 is restricted due to the power balance over the negative first to the positive third lens groups, e.g., $1.0<f1/fw<1.2$; here, f1 designates the focal length of the entire negative first lens group 10, and fw designates the focal length of the entire wide-angle zoom lens system at the short focal length extremity.

Accordingly, condition (1), at the same time, indicates that the combined power of the negative lens elements in the negative first lens group 10 is strong.

If the power of the positive lens element in the negative first lens group 10 becomes weaker to the extent that $fw/f_{1P}$ exceeds the lower limit of condition (1), the effect of moving the entrance pupil position toward the object is reduced, so that the diameter of the frontmost lens group becomes larger.

If the power of the positive lens element in the negative first lens group 10 becomes stronger to the extent that $fw/f_{1P}$ exceeds the upper limit of condition (1), distortion, field curvature and astigmatic difference, which increase as an increase of the angle-of-view, largely occur. Consequently, the correcting thereof cannot be sufficiently made.

Condition (2) specifies the shape factor $((r_{1P-2}+r_{1P-1})/(r_{1P-2}-r_{1P-1}))$ of the positive lens element which has a strong power in accordance with condition (1). Condition (2) substantially indicates that the positive lens element is a biconvex lens element. Further, for the purpose of reducing the occurrence of aberrations in the positive lens element, the strong power is adequately distributed over each surface of the positive lens element.

If $(r_{1P-2}+r_{1P-1})/(r_{1P-2}-r_{1P-1})$ exceeds the lower limit of condition (2), the object-side surface of the positive lens element becomes concave or flat, so that the angle of incidence of the off-axis light rays on the object-side surface increases. Consequently, coma and astigmatic difference occur excessively.

If $(r_{1P-2}+r_{1P-1})/(r_{1P-2}-r_{1P-1})$ exceeds the upper limit of condition (2), the image-side surface of the positive lens element becomes concave or flat, so that the exit angle of the off-axis light rays on the image-side surface increases. Consequently, coma and astigmatic difference occur excessively.

In the wide-angle zoom lens system of the present invention, in order to achieve an angle-of-view of 100° at the short focal length extremity, the change in astigmatic difference and field curvature, upon zooming, which occur as an increase of the angle-of-view is reduced by varying the distance between the two positive lens groups on the side of the image (i.e., the second lens group 20 and the third lens group 30) upon zooming at different speeds.

Condition (3) specifies the ratio of the traveling distance of the positive second lens group 20 to that of the positive third lens group 30.

If $\Delta X2/\Delta X3$ exceeds the lower limit of condition (3), the change in the distance between the positive second lens group 20 and the positive third lens group 30 becomes smaller, so that the effect of reducing aberration fluctuations upon zooming is reduced. Consequently, aberrations at the short focal length extremity and at the long focal length extremity cannot be balanced.

If $\Delta X2/\Delta X3$ exceeds the upper limit of condition (3), the change in the distance between the positive second lens group 20 and the positive third lens group 30 becomes too large. As a result, the following disadvantages are caused: (i) the overall length of the wide-angle zoom lens system at the short focal length extremity is increased, (ii) the entrance pupil cannot be appropriately positioned so as to reduce the diameter of the frontmost lens group, and (iii) coma cannot be adequately balanced.

In order to balance coma by varying the distance between the positive second lens group 20 and the positive third lens group 30 to determine the entrance pupil position appropriately, the diaphragm S is preferably positioned on the object-side of the positive third lens group 30, and is moved together therewith.

Furthermore, in the wide-angle zoom lens system of the present invention, in order to reduce aberrations which occur as an increase of the angle-of-view, it is desirable to provide a plastic aspherical lens element in the negative first lens group 10, and the plastic aspherical lens element preferably includes a meniscus lens element, with a weak power, having the convex surface facing toward the object. The aspherical lens element is desirably formed so that a positive power becomes stronger as the height from the optical axis increases, compared with a positive power of a spherical surface.

In order to precisely shape the aspherical surface by plastic, the position of the plastic aspherical lens element is preferably as closer to the image side in the negative first lens group 10 as possible where the lens diameter is smaller; however, if the plastic aspherical lens element is positioned at the most image-side of the negative first lens group 10, the most image-side surface (exposed to the positive second lens group 20) is easily made dirty due to finger contact and is easily marked/scratched during the assembly process. To avoid such disadvantages, the plastic aspherical lens element is provided on the object-side of the most image-side positive lens element in the negative first lens group 10 so that the plastic aspherical lens element is not marked or scratched.

Condition (4) specifies the power of the plastic meniscus aspherical lens element. Plastic has a high coefficient of linear expansion, and the performance of plastic (i.e., the shape) varies largely due to environmental changes, than the performance of glass does.

Accordingly, the power of the plastic meniscus aspherical lens element is set to be in the range of condition (4), so that the adverse influence of the environmental changes is made smaller, and that the effect of asphericity can be enhanced.

Condition (5) specifies the amount of asphericity of the plastic meniscus aspherical lens element.

If $(\Delta_{ASP1}-\Delta_{ASP2})/fw$ exceeds the lower limit of condition (5), the amount of asphericity decreases, so that the effect on the correcting of distortion and astigmatic difference becomes smaller. Consequently, aberrations over the entire wide-angle zoom lens system cannot be adequately maintained.

If $(\Delta_{ASP1}-\Delta_{ASP2})/fw$ exceeds the upper limit of condition (5), the amount of asphericity increases, so that distortion and astigmatic difference are over-corrected. Moreover, an increase of the amount of asphericity makes the molding of the plastic meniscus aspherical lens element difficult.

Furthermore, the effect of asphericity can be enhanced when the aspherical surface is formed on both sides of the positive lens element. This is because, the correcting of aberrations can be performed on each surface, i.e., the burden of the correcting of aberrations is divided.

Specific numerical data of the embodiments will be described hereinafter. In the diagrams of chromatic aberration (axial chromatic aberration) represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, and M designates the meridional image. In the tables, FNO. designates the f-number, f designates the focal length of the entire zoom lens system, fB designates the back focal distance (the distance from the most image-side surface to the image plane), W designates the half angle-of-view (°), r designates the radius of curvature, d designates the lens-element thickness or distance between lens elements, $N_d$ designates the refractive index of the d-line, and $v_d$ designates the Abbe number.

In addition to the above, an aspherical surface which is symmetrical with respect to the optical axis is defined as follows:

$$x=cy^2/(1+[1-\{1+K\}c^2y^2]^{1/2})+A4y^4+A6y^6+A8y^8+A10y^{10}$$

wherein:
c designates a curvature of the aspherical vertex (1/r);
y designates a distance from the optical axis;
K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient.

In the wide-angle zoom lens systems of Embodiments 1 through 5 which will be discussed hereinafter are arranged to materialize the following features at the same time:

(i) the diameter of the frontmost lens group can be reduced by providing the biconvex positive lens element L4 at the most image-side in the negative first lens group 10; and (ii) aberrations which occur as an increase of the angle-of-view can be reduced by the aspherical surface(s) formed on the meniscus lens element L3 in the negative first lens group 10.

[Embodiment 1]

FIG. 1 is a lens arrangement, at the short focal length extremity, of the wide-angle zoom lens system according to the first embodiment of the present invention. FIGS. 2A through 2E show aberrations occurred in the lens arrangement shown in FIG. 1. FIG. 3 is a lens arrangement, at an intermediate focal length extremity, of the wide-angle zoom lens system according to the first embodiment. FIGS. 4A through 4E show aberrations occurred in the lens arrangement shown in FIG. 3. FIG. 5 is a lens arrangement, at the long focal length extremity, of the wide-angle zoom lens system according to the first embodiment. FIGS. 6A through 6E show aberrations occurred in the lens arrangement shown in FIG. 5. Table 1 shows the numerical data of the first embodiment. The diaphragm S is provided 1.70 from the object side of the positive third lens group 30 (in front of surface No. 12).

TABLE 1

FNO. = 1:4.2 - 4.7 - 5.8
f = 18.50 - 23.99 - 33.99
W = 50.7 - 43.4 - 33.2
fB = 37.00 - 44.61 - 58.19

| Surf. No. | r | d | Nd | $v_d$ |
|---|---|---|---|---|
| 1 | 34.174 | 1.50 | 1.77250 | 49.6 |
| 2 | 14.648 | 8.49 | — | — |
| 3 | 57.681 | 1.50 | 1.77250 | 49.6 |
| 4 | 18.098 | 4.76 | — | — |
| 5* | 64.183 | 2.60 | 1.52538 | 56.3 |
| 6* | 27.812 | 1.90 | — | — |
| 7 | 83.922 | 3.63 | 1.80518 | 25.4 |
| 8 | −87.099 | 14.50-7.74-1.40 | — | — |
| 9 | 24.334 | 4.33 | 1.53172 | 48.9 |
| 10 | −18.211 | 1.60 | 1.83400 | 37.2 |
| 11 | −131.698 | 8.94-6.01-3.10 | — | — |
| 12 | 45.117 | 2.77 | 1.54814 | 45.8 |
| 13 | −31.049 | 0.15 | — | — |
| 14 | 31.703 | 3.66 | 1.51742 | 52.4 |
| 15 | −18.187 | 1.50 | 1.79952 | 42.2 |
| 16 | 177.316 | 5.73 | — | — |
| 17 | 79.749 | 2.00 | 1.84666 | 23.8 |
| 18 | 20.911 | 1.42 | — | — |
| 19 | −384.068 | 2.64 | 1.69680 | 55.5 |
| 20 | −25.001 | — | — | — |

Aspherical surface data (the aspherical surface coefficients not indicated are zero (0.00)):

| Surf. No. | K | A4 | A6 | A8 |
|---|---|---|---|---|
| 5 | $-0.10000 \times 10$ | $-0.22215 \times 10^{-5}$ | $0.14363 \times 10^{-6}$ | $-0.72523 \times 10^{-9}$ |
| 6 | $-0.10000 \times 10$ | $-0.48036 \times 10^{-4}$ | $0.43888 \times 10^{-7}$ | $-0.91037 \times 10^{-9}$ |

*designates the aspherical surface which is rotationally symmetrical with respect to the optical axis.

[Embodiment 2]

Figure 9:
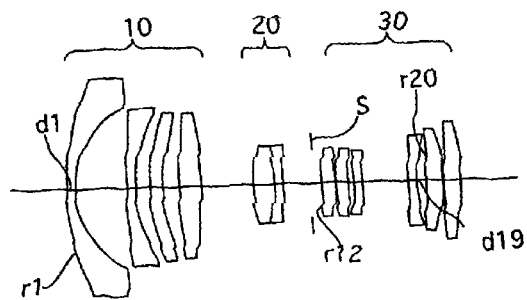
FIG. 9 is a lens arrangement, at an intermediate focal length extremity, of the wide-angle zoom lens system according to the second embodiment.
Figures 10A, 10B, 10C, 10D, 10E:
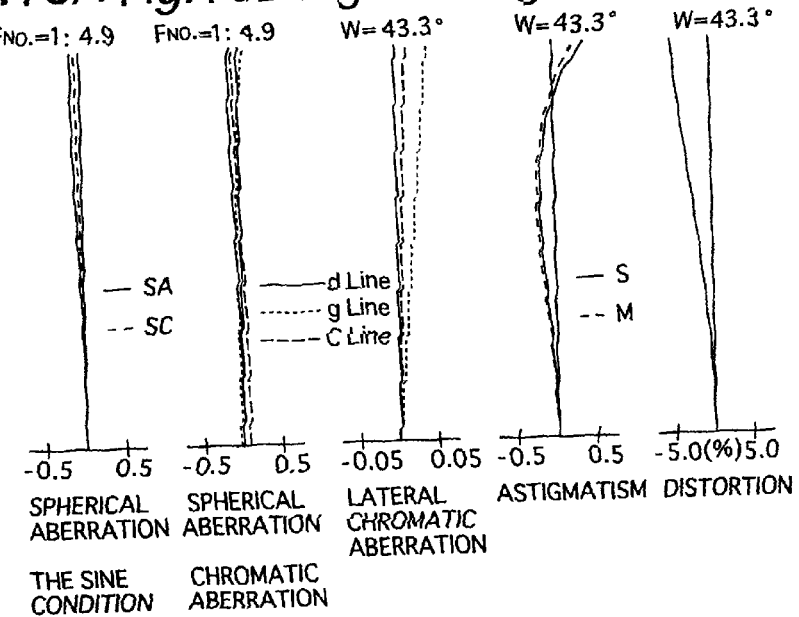
FIGS. 10A, 10B, 10C, 10D and 10E show aberrations occurred in the lens arrangement shown in FIG. 9.
Figure 11:
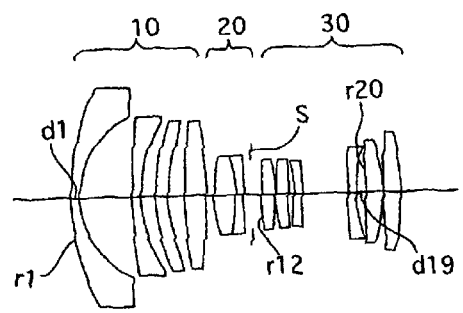
FIG. 11 is a lens arrangement, at the long focal length extremity, of the wide-angle zoom lens system according to the second embodiment.
Figures 12A, 12B, 12C, 12D, 12E:
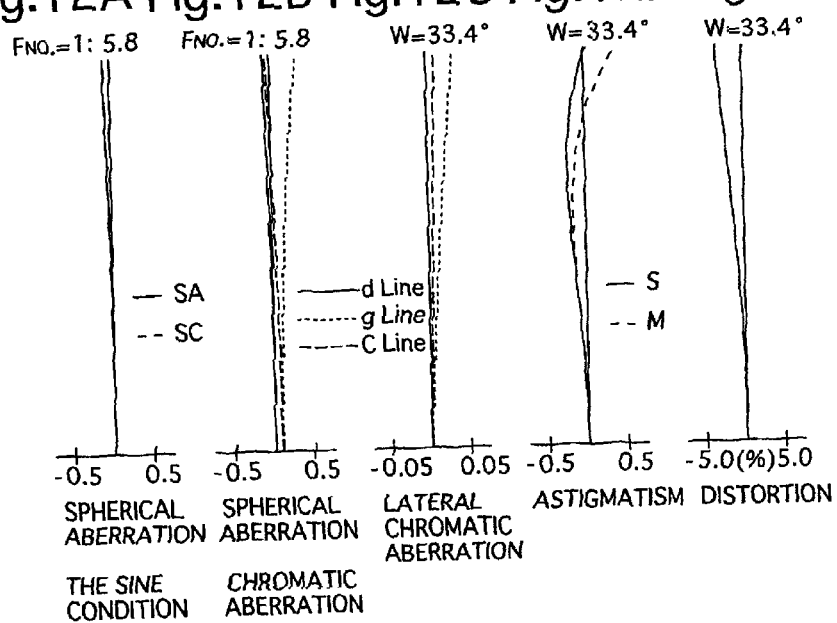
FIGS. 12A, 12B, 12C, 12D and 12E show aberrations occurred in the lens arrangement shown in FIG. 11.

FIG. 7 is a lens arrangement, at the short focal length extremity, of the wide-angle zoom lens system according to the second embodiment of the present invention. FIGS. 8A through 8E show aberrations occurred in the lens arrangement shown in FIG. 7. FIG. 9 is a lens arrangement, at an intermediate focal length extremity, of the wide-angle zoom lens system according to the second embodiment. FIGS. 10A through 10E show aberrations occurred in the lens arrangement shown in FIG. 9. FIG. 11 is a lens arrangement, at the long focal length extremity, of the wide-angle zoom lens system according to the second embodiment. FIGS. 12A through 12E show aberrations occurred in the lens arrangement shown in FIG. 11. Table 2 shows the numerical data of the second embodiment. The diaphragm S is provided 1.70 from the object side of the third lens group 30 (in front of surface No. 12).

TABLE 2

FNO. = 1:4.3 - 4.9 - 5.8
f = 18.50 - 24.16 - 33.99
W = 50.8 - 43.3 - 33.4
fB = 37.00 - 45.17 - 58.74

| Surf. No. | r | d | Nd | $v_d$ |
|---|---|---|---|---|
| 1 | 42.781 | 1.50 | 1.77250 | 49.6 |
| 2 | 15.570 | 9.25 | — | — |
| 3 | 113.619 | 1.50 | 1.80400 | 46.6 |
| 4 | 23.859 | 2.55 | — | — |
| 5 | 32.745 | 2.20 | 1.52538 | 56.3 |
| 6* | 22.632 | 2.95 | — | — |
| 7 | 86.327 | 3.80 | 1.78472 | 25.7 |
| 8 | −85.217 | 18.40-9.27-1.40 | — | — |
| 9 | 24.077 | 3.87 | 1.53172 | 48.9 |
| 10 | −25.767 | 1.50 | 1.83400 | 37.2 |
| 11 | −545.179 | 10.11-6.84-3.10 | — | — |
| 12 | 59.104 | 2.49 | 1.51742 | 52.4 |
| 13 | −32.967 | 0.10 | — | — |
| 14 | 30.948 | 2.16 | 1.51742 | 52.4 |
| 15 | 265.450 | 1.04 | — | — |
| 16 | −29.872 | 1.50 | 1.74400 | 44.8 |
| 17 | −120.776 | 8.22 | — | — |
| 18 | 479.675 | 1.50 | 1.84666 | 23.8 |
| 19 | 27.054 | 1.67 | — | — |
| 20 | −229.357 | 3.04 | 1.51633 | 64.1 |
| 21 | −25.994 | 0.10 | — | — |
| 22 | 164.353 | 3.00 | 1.51633 | 64.1 |
| 23 | −48.886 | — | — | — |

Aspherical surface data (the aspherical surface coefficients not indicated are zero (0.00)):

| Surf. No. | K | A4 | A6 | A8 |
|---|---|---|---|---|
| 6 | $-0.10000 \times 10$ | $-0.37647 \times 10^{-4}$ | $-0.27292 \times 10^{-7}$ | $-0.11154 \times 10^{-9}$ |

*designates the aspherical surface which is rotationally symmetrical with respect to the optical axis.

[Embodiment 3]

Figure 15:
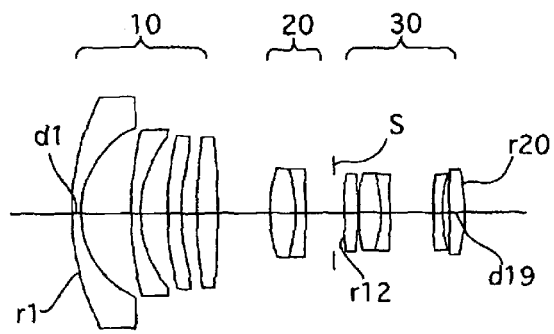
FIG. 15 is a lens arrangement, at an intermediate focal length extremity, of the wide-angle zoom lens system according to the third embodiment.
Figures 16A, 16B, 16C, 16D, 16E:
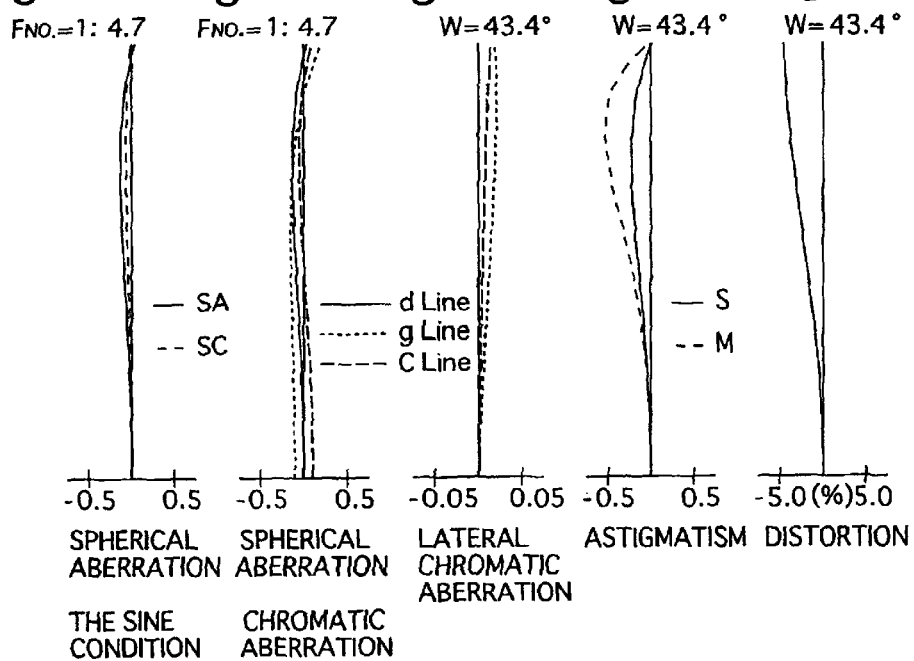
FIGS. 16A, 16B, 16C, 16D and 16E show aberrations occurred in the lens arrangement shown in FIG. 15.
Figure 17:
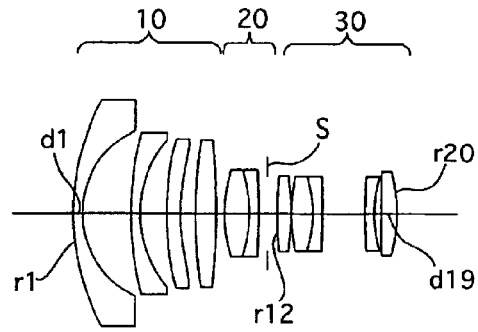
FIG. 17 is a lens arrangement, at the long focal length extremity, of the wide-angle zoom lens system according to the third embodiment.
Figures 18A, 18B, 18C, 18D, 18E:
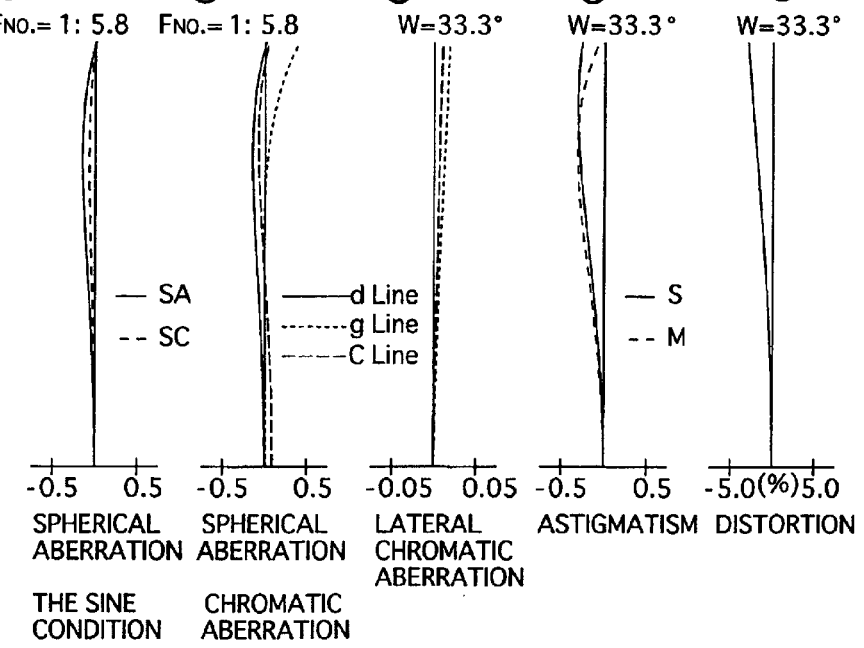
FIGS. 18A, 18B, 18C, 18D and 18E show aberrations occurred in the lens arrangement shown in FIG. 17.

FIG. 13 is a lens arrangement, at the short focal length extremity, of the wide-angle zoom lens system according to the third embodiment of the present invention. FIGS. 14A through 14E show aberrations occurred in the lens arrangement shown in FIG. 13. FIG. 15 is a lens arrangement, at an intermediate focal length extremity, of the wide-angle zoom lens system according to the third embodiment. FIGS. 16A through 16E show aberrations occurred in the lens arrangement shown in FIG. 15. FIG. 17 is a lens arrangement, at the long focal length extremity, of the wide-angle zoom lens system according to the third embodiment. FIGS. 18A through 18E show aberrations occurred in the lens arrangement shown in FIG. 17. Table 3 shows the numerical data of the third embodiment. The diaphragm S is provided 1.70 from the object side of the third lens group 30 (in front of surface No. 12).

TABLE 3

FNO. = 1:4.2 - 4.7 - 5.8
f = 18.50 - 24.00 - 33.96
W = 50.8 - 43.4 - 33.3
fB = 37.00 - 44.72 - 58.18

| Surf. No. | r | d | Nd | $v_d$ |
|---|---|---|---|---|
| 1 | 39.064 | 1.50 | 1.77250 | 49.6 |
| 2 | 14.978 | 8.14 | — | — |
| 3 | 52.559 | 1.50 | 1.77250 | 49.6 |
| 4 | 18.834 | 4.39 | — | — |
| 5* | 57.522 | 2.20 | 1.52538 | 56.3 |
| 6* | 29.625 | 2.50 | — | — |
| 7 | 81.563 | 3.37 | 1.80518 | 25.4 |
| 8 | −119.619 | 15.79-8.30-1.40 | — | — |
| 9 | 24.173 | 4.07 | 1.53172 | 48.9 |
| 10 | −22.887 | 1.60 | 1.83400 | 37.2 |
| 11 | −141.368 | 9.14-6.19-3.10 | — | — |
| 12 | 84.072 | 2.25 | 1.54814 | 45.8 |
| 13 | −48.523 | 0.10 | — | — |
| 14 | 31.665 | 3.57 | 1.51742 | 52.4 |
| 15 | −19.374 | 1.50 | 1.79952 | 42.2 |
| 16 | −193.960 | 6.98 | — | — |
| 17 | 82.770 | 1.50 | 1.84666 | 23.8 |
| 18 | 21.319 | 1.15 | — | — |
| 19 | 486.411 | 2.52 | 1.69680 | 55.5 |
| 20 | −27.050 | — | — | — |

Aspherical surface data (the aspherical surface coefficients not indicated are zero (0.00)):

| Surf. No. | K | A4 | A6 | A8 |
|---|---|---|---|---|
| 5 | $-0.10000 \times 10$ | $-0.13622 \times 10^{-5}$ | $0.22292 \times 10^{-6}$ | $-0.93503 \times 10^{-9}$ |
| 6 | $-0.10000 \times 10$ | $-0.42690 \times 10^{-4}$ | $0.14252 \times 10^{-6}$ | $-0.11913 \times 10^{-8}$ |

*designates the aspherical surface which is rotationally symmetrical with respect to the optical axis.

[Embodiment 4]

Figure 19:
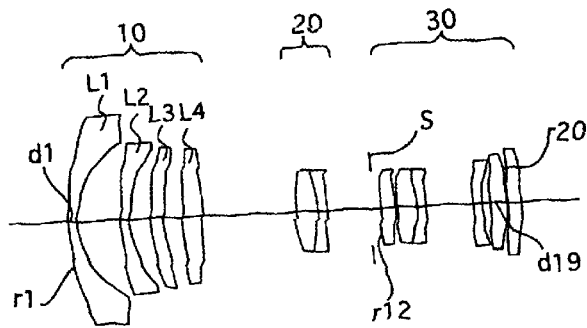
FIG. 19 is a lens arrangement, at the short focal length extremity, of the wide-angle zoom lens system according to a fourth embodiment of the present invention.
Figures 20A, 20B, 20C, 20D, 20E:
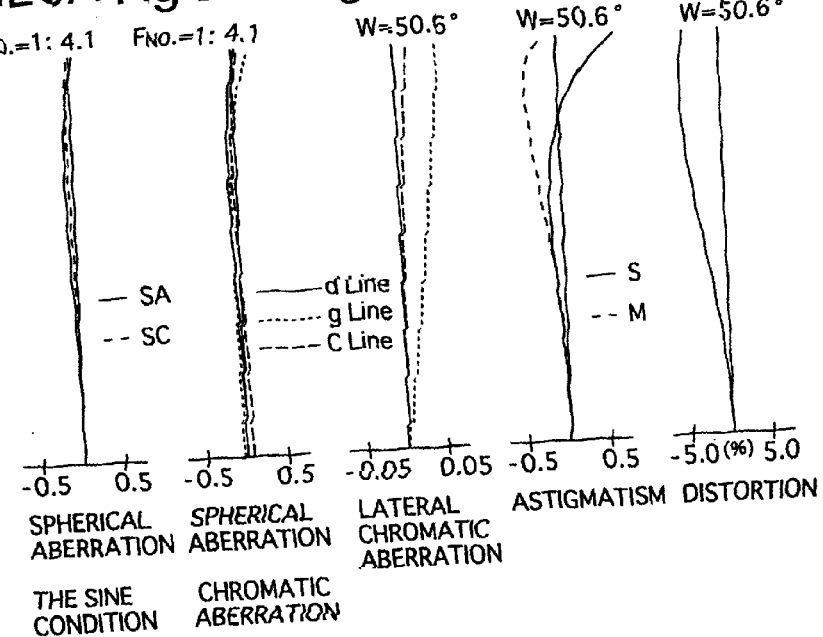
FIGS. 20A, 20B, 20C, 20D and 20E show aberrations occurred in the lens arrangement shown in FIG. 19.
Figure 21:
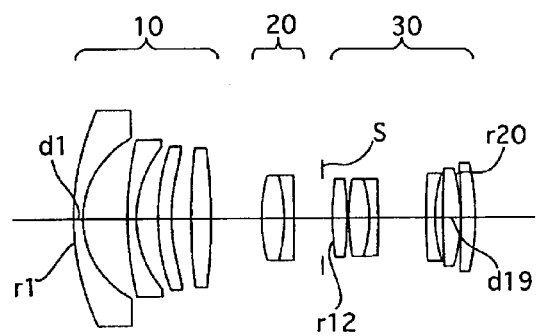
FIG. 21 is a lens arrangement, at an intermediate focal length extremity, of the wide-angle zoom lens system according to the fourth embodiment.
Figures 22A, 22B, 22C, 22D, 22E:
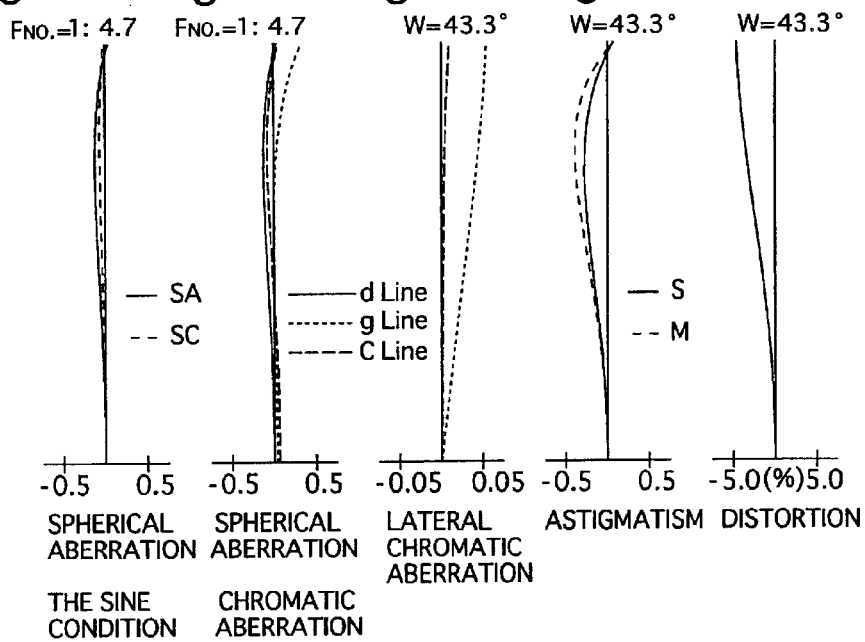
FIGS. 22A, 22B, 22C, 22D and 22E show aberrations occurred in the lens arrangement shown in FIG. 21.
Figure 23:
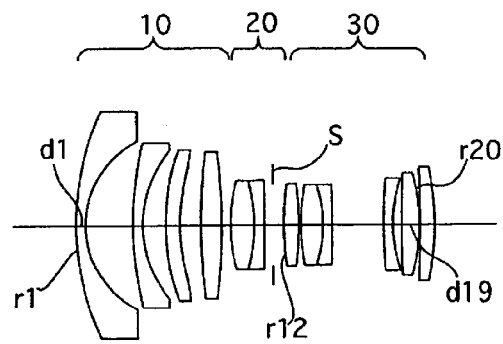
FIG. 23 is a lens arrangement, at the long focal length extremity, of the wide-angle zoom lens system according to the fourth embodiment.
Figures 24A, 24B, 24C, 24D, 24E:
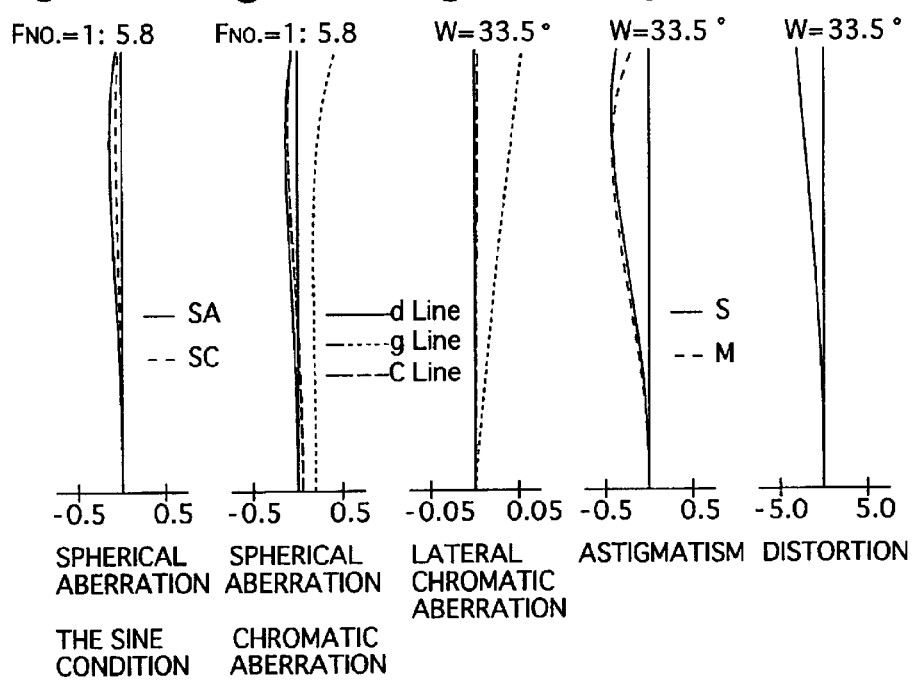
FIGS. 24A, 24B, 24C, 24D and 24E show aberrations occurred in the lens arrangement shown in FIG. 23.

FIG. 19 is a lens arrangement, at the short focal length extremity, of the wide-angle zoom lens system according to the fourth embodiment of the present invention. FIGS. 20A through 20E show aberrations occurred in the lens arrangement shown in FIG. 19. FIG. 21 is a lens arrangement, at an intermediate focal length extremity, of the wide-angle zoom lens system according to the fourth embodiment. FIGS. 22A through 22E show aberrations occurred in the lens arrangement shown in FIG. 21. FIG. 23 is a lens arrangement, at the long focal length extremity, of the wide-angle zoom lens system according to the fourth embodiment. FIGS. 24A through 24E show aberrations occurred in the lens arrangement shown in FIG. 23. Table 4 shows the numerical data of the fourth embodiment. The diaphragm S is provided 1.70 from the object side of the third lens group 30 (in front of surface No. 12).

TABLE 4

FNO. = 1:4.1 - 4.7 - 5.8
f = 18.62 - 24.10 - 33.81
W = 50.6 - 43.3 - 33.5
fB = 37.00-44.82-58.26

| Surf. No. | r | d | Nd | $v_d$ |
|---|---|---|---|---|
| 1 | 42.800 | 1.50 | 1.77250 | 49.6 |
| 2 | 14.900 | 7.49 | — | — |
| 3 | 55.963 | 1.50 | 1.77250 | 49.6 |
| 4 | 18.556 | 3.61 | — | — |
| 5* | 41.459 | 2.20 | 1.52538 | 56.3 |
| 6* | 27.768 | 3.22 | — | — |
| 7 | 92.741 | 3.31 | 1.80518 | 25.4 |
| 8 | −92.741 | 16.21-8.42-1.40 | — | — |
| 9 | 25.758 | 3.80 | 1.53172 | 48.9 |
| 10 | −25.758 | 1.60 | 1.83400 | 37.2 |
| 11 | −379.030 | 9.39-6.47-3.10 | — | — |
| 12 | 50.501 | 2.45 | 1.54814 | 45.8 |
| 13 | −50.501 | 0.30 | — | — |

TABLE 4-continued

| | | | |
|---|---|---|---|
| 14 | 37.704 | 3.48 | 1.51742 | 52.4 |
| 15 | −20.160 | 1.50 | 1.79952 | 42.2 |
| 16 | −225.000 | 8.11 | — | — |
| 17 | 98.268 | 1.50 | 1.84666 | 23.8 |
| 18 | 22.534 | 1.37 | — | — |
| 19 | 197.685 | 2.91 | 1.48749 | 70.2 |
| 20 | −28.799 | 0.10 | — | — |
| 21 | −170.400 | 2.35 | 1.48749 | 70.2 |
| 22 | −42.904 | — | — | — |

Aspherical surface data (the aspherical surface coefficients not indicated are zero (0.00)):

| Surf. No. | K | A4 | A6 | A8 |
|---|---|---|---|---|
| 5 | −0.10000 × 10 | 0.87937 × 10$^{-5}$ | 0.13764 × 10$^{-6}$ | −0.58615 × 10$^{-9}$ |
| 6 | −0.10000 × 10 | −0.38471 × 10$^{-4}$ | 0.65361 × 10$^{-7}$ | −0.88873 × 10$^{-9}$ |

*designates the aspherical surface which is rotationally symmetrical with respect to the optical axis.

[Embodiment 5]

Figure 25:
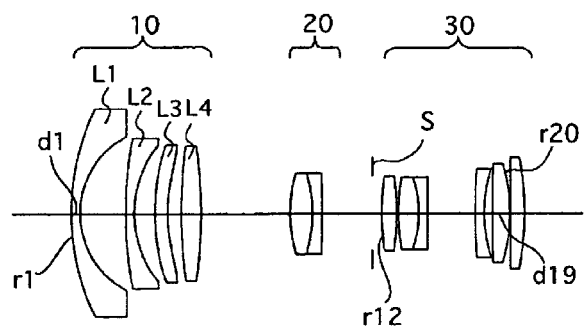
FIG. 25 is a lens arrangement, at the short focal length extremity, of the wide-angle zoom lens system according to a fifth embodiment of the present invention.
Figures 26A, 26B, 26C, 26D, 26E:
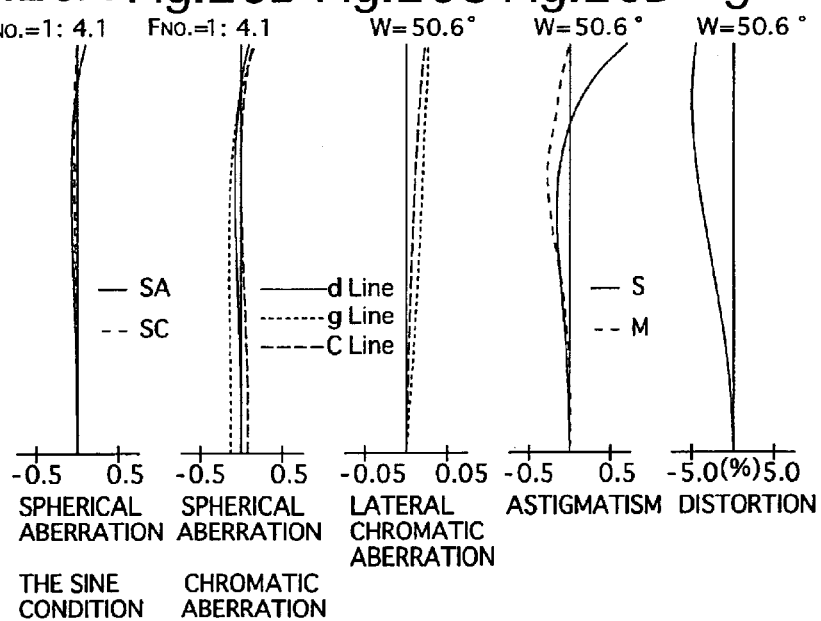
FIGS. 26A, 26B, 26C, 26D and 26E show aberrations occurred in the lens arrangement shown in FIG. 25.
Figure 27:
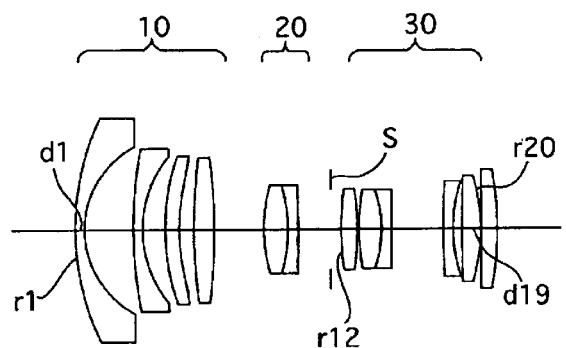
FIG. 27 is a lens arrangement, at an intermediate focal length extremity, of the wide-angle zoom lens system according to the fifth embodiment.
Figures 28A, 28B, 28C, 28D, 28E:
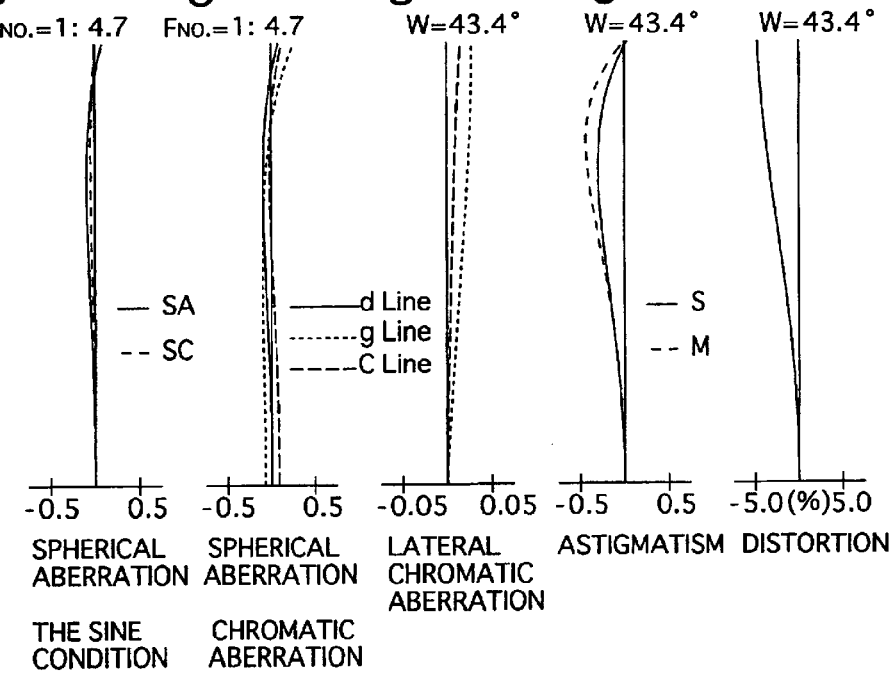
FIGS. 28A, 28B, 28C, 28D and 28E show aberrations occurred in the lens arrangement shown in FIG. 27.

FIG. 25 is a lens arrangement, at the short focal length extremity, of the wide-angle zoom lens system according to the fifth embodiment of the present invention. FIGS. 26A through 26E show aberrations occurred in the lens arrangement shown in FIG. 25. FIG. 27 is a lens arrangement, at an intermediate focal length extremity, of the wide-angle zoom lens system according to the fifth embodiment. FIGS. 28A through 28E show aberrations occurred in the lens arrangement shown in FIG. 27. FIG. 29 is a lens arrangement, at the long focal length extremity, of the wide-angle zoom lens system according to the fifth embodiment. FIGS. 30A through 30E show aberrations occurred in the lens arrangement shown in FIG. 29. Table 5 shows the numerical data of the fourth embodiment. The diaphragm S is provided 1.70 from the object side of the third lens group 30 (in front of surface No. 12).

TABLE 5

FNO. = 1:4.1 - 4.7 - 5.8
f = 18.62 - 24.04 - 33.89
W = 50.6 - 43.4 - 33.4
fB = 37.02 - 44.93 - 58.82

| Surf. No. | r | d | Nd | $v_d$ |
|---|---|---|---|---|
| 1 | 40.623 | 1.50 | 1.77250 | 49.6 |
| 2 | 14.900 | 7.75 | — | — |
| 3 | 66.393 | 1.50 | 1.77250 | 49.6 |
| 4 | 18.346 | 3.58 | — | — |
| 5* | 40.464 | 2.20 | 1.52538 | 56.3 |
| 6* | 26.924 | 2.36 | — | — |
| 7 | 88.278 | 3.33 | 1.80518 | 25.4 |
| 8 | −88.278 | 15.02–7.91–1.40 | — | — |
| 9 | 24.750 | 3.81 | 1.53172 | 48.9 |
| 10 | −24.750 | 1.60 | 1.83400 | 37.2 |
| 11 | −328.301 | 10.17–6.83–3.10 | — | — |
| 12 | 45.385 | 2.51 | 1.54814 | 45.8 |
| 13 | −45.385 | 0.30 | — | — |
| 14 | 38.025 | 3.46 | 1.51742 | 52.4 |
| 15 | −19.310 | 1.50 | 1.79952 | 42.2 |
| 16 | −2345.730 | 8.25 | — | — |
| 17 | 134.792 | 1.50 | 1.84666 | 23.8 |
| 18 | 24.330 | 1.40 | — | — |
| 19 | 325.500 | 2.98 | 1.51633 | 64.1 |
| 20 | −27.773 | 0.10 | — | — |
| 21 | −814.439 | 2.44 | 1.51742 | 52.4 |
| 22 | −50.165 | — | — | — |

TABLE 5-continued

Aspherical surface data (the aspherical surface coefficients not indicated are zero (0.00)):

| Surf. No. | K | A4 | A6 | A8 |
|---|---|---|---|---|
| 5 | −0.10000 × 10 | 0.11264 × 10$^{-4}$ | 0.13342 × 10$^{-6}$ | −0.75733 × 10$^{-9}$ |
| 6 | −0.10000 × 10 | −0.37990 × 10$^{-4}$ | 0.49293 × 10$^{-7}$ | −0.97407 × 10$^{-9}$ |

*designates the aspherical surface which is rotationally symmetrical with respect to the optical axis.

Table 6 shows the numerical values of each condition for each embodiment.

TABLE 6

| | Embod. 1 | Embod. 2 | Embod. 3 | Embod. 4 | Embod. 5 |
|---|---|---|---|---|---|
| Cond. (1) | 0.345 | 0.335 | 0.305 | 0.321 | 0.337 |
| Cond. (2) | 0.019 | −0.006 | 0.189 | 0.000 | 0.000 |
| Cond. (3) | 0.724 | 0.677 | 0.715 | 0.704 | 0.676 |
| Cond. (4) | 0.193 | 0.123 | 0.155 | 0.110 | 0.115 |
| Cond. (5) | 0.078 | 0.089 | 0.078 | 0.071 | 0.068 |

As can be understood from Table 6, the numerical values of the first through fifth embodiments satisfy conditions (1) through (5), and as can be understood from the drawings, the various aberrations at each focal length have been adequately corrected.

According to the above description, a miniaturized and wide-angle zoom lens system, which (i) achieves a wide angle-of-view of about 100° at the short focal length extremity, and (ii) reduces the lens diameter tends to be larger as an increase of the angle-of-view, can be achieved.

What is claimed is:

1. A wide-angle zoom lens system comprising a negative first lens group, a positive second lens group, and a positive third lens group, in this order from an object, wherein upon zooming from the short focal length extremity to the long focal length extremity, the distance between said negative first lens group and said positive second lens group decreases, and the distance between said positive second lens group and said positive third lens group decreases;

wherein said negative first lens group comprises at least one positive lens element; and wherein said wide-angle zoom lens system satisfies the following conditions:

$$0.30 < fw/f_{1P} < 0.40$$

$$-1.0 < (r_{1P-2} + r_{1P-1})/(r_{1P-2} - r_{1P-1}) < 1.0$$

wherein fw designates the entire focal length of the zoom lens system at the short focal length extremity;

$f_{1P}$ designates the focal length of a positive lens element having the strongest optical power (hereinafter, power) in said negative first lens group;

$r_{1P-1}$ designates the radius of curvature of the object-side surface of said positive lens element having the strongest power in said negative first lens group; and $r_{1P-2}$ designates the radius of curvature of the image-side surface of said positive lens element having the strongest power in said negative first lens group.

2. The wide-angle zoom lens system according to claim 1, wherein said negative first lens group comprises a negative meniscus lens element having the convex surface facing toward said object, another negative meniscus lens element having the convex surface facing toward said object, a meniscus lens element, with a weak power, having the convex surface facing toward said object, and a biconvex positive lens element, in this order from said object; and wherein said biconvex positive lens element at the most image-side of said negative first lens group has the strongest positive power in said negative first lens group.

3. The wide-angle zoom lens system according to claim 1, further satisfying the following condition:

$$0.66 < \Delta X2/\Delta X3 < 0.80$$

wherein $\Delta X2$ designates the traveling distance of said positive second lens group from the short focal length extremity to the long focal length extremity; and $\Delta X3$ designates the traveling distance of said positive third lens group from the short focal length extremity to the long focal length extremity.

4. The wide-angle zoom lens system according to claim 1, wherein a diaphragm is provided on the object-side of said positive third lens group, and arranged to move together with said positive third lens group.

5. A wide-angle zoom lens system comprising a negative first lens group, a positive second lens group, and a positive third lens group, in this order from an object, wherein upon zooming from the short focal length extremity to the long focal length extremity, the distance between said negative first lens group and said positive second lens group decreases, and the distance between said positive second lens group and said positive third lens group decreases;

wherein said negative first lens group comprises a positive lens element provided at the most image-side thereof, and a meniscus lens element that has a weak power, that has the convex surface facing toward said object, and that is positioned on the object-side of said positive lens element;

wherein said meniscus lens element is made of plastic, and comprises at least one aspherical surface on which a positive power becomes stronger as the height from the optical axis increases, compared with a positive power of a paraxial spherical surface portion of said aspherical surface; and wherein said wide-angle zoom lens system satisfies the following condition:

$$fw/|fm| < 0.25$$

wherein fm designates the focal length of said plastic meniscus lens element having the aspherical surface; and fw designates the entire focal length of said wide-angle zoom lens system at the short focal length extremity.

6. The wide-angle zoom lens system according to claim 5, wherein said plastic meniscus lens element comprises an aspherical surface on both surfaces thereof; and wherein said wide-angle zoom lens system satisfies the following condition:

$$0.06 < (\Delta_{ASP1} - \Delta_{ASP2})/fw < 0.10$$

wherein $\Delta_{ASP1}$ designates the difference in sagitta of said aspherical surface and sagitta of a paraxial spherical surface at the height h from the optical axis on the object-side surface of said plastic meniscus lens element; and $\Delta_{ASP2}$ designates the difference in sagitta of said aspherical surface and sagitta of a paraxial spherical surface at the height h from the optical axis on the image-side surface of said plastic meniscus lens element.

* * * * *